(12) United States Patent
Singal et al.

(10) Patent No.: US 12,180,939 B2
(45) Date of Patent: Dec. 31, 2024

(54) LEARNING-BASED BACKUP CONTROLLER FOR A WIND TURBINE

(71) Applicant: General Electric Company, Schenectady, NY (US)

(72) Inventors: Kalpesh Singal, Ballston Spa, NY (US); Mustafa Tekin Dokucu, Latham, NY (US); Fernando Javier D'Amato, Niskayuna, NY (US); Georgios Boutselis, Niskayuna, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 247 days.

(21) Appl. No.: 17/698,040

(22) Filed: Mar. 18, 2022

(65) Prior Publication Data

US 2023/0296078 A1 Sep. 21, 2023

(51) Int. Cl.
*F03D 7/04* (2006.01)
*F03D 7/02* (2006.01)

(52) U.S. Cl.
CPC ........... *F03D 7/046* (2013.01); *F03D 7/0264* (2013.01); *F03D 7/045* (2013.01); *F03D 7/047* (2013.01);
(Continued)

(58) Field of Classification Search
CPC ........ F03D 7/046; F03D 7/0264; F03D 7/045; F03D 7/047; F05B 2270/1074;
(Continued)

(56) References Cited

U.S. PATENT DOCUMENTS 10,364,799 B1 7/2019 Roakr et al.
2014/0086723 A1 3/2014 Bengtson et al.
(Continued)

FOREIGN PATENT DOCUMENTS

EP 3842635 A1 6/2021
WO WO 00/62135 A1 10/2000
(Continued)

OTHER PUBLICATIONS

EP Search Report for EP application No. 23161236.7, Jul. 24, 2023, 5 pages.
(Continued)

*Primary Examiner* — Michael W Choi
(74) *Attorney, Agent, or Firm* — Dority & Manning, P.A.

(57) ABSTRACT

A method for providing backup control for a supervisory controller of at least one wind turbine includes observing, via a learning-based backup controller of the at least one wind turbine, at least one operating parameter of the supervisory controller under normal operation. The method also includes learning, via the learning-based backup controller, one or more control actions of the at least one wind turbine based on the operating parameter(s). Further, the method includes receiving, via the learning-based backup controller, an indication that the supervisory controller is unavailable to continue the normal operation. Upon receipt of the indication, the method includes controlling, via the learning-based backup controller, the wind turbine(s) using the learned one or more control actions until the supervisory controller becomes available again. Moreover, the control action(s) defines a delta that one or more setpoints of the wind turbine(s) should be adjusted by to achieve a desired outcome.

20 Claims, 7 Drawing Sheets

(52) U.S. Cl.
CPC . *F05B 2270/1074* (2013.01); *F05B 2270/328* (2013.01); *F05B 2270/335* (2013.01); *F05B 2270/709* (2013.01)

(58) Field of Classification Search
CPC .......... F05B 2270/328; F05B 2270/335; F05B 2270/709
See application file for complete search history.

(56) References Cited

U.S. PATENT DOCUMENTS

2019/0249646 A1*  8/2019  Roark ................... G05B 19/058
2020/0026246 A1   1/2020  Nakagawa
2022/0325696 A1* 10/2022  Gollnick .............. G05B 13/027

FOREIGN PATENT DOCUMENTS

WO   WO 2019/038711 A1 *  2/2019   .......... F05B 2260/84
WO   WO 2021/233552 A1    11/2021

OTHER PUBLICATIONS

Attia et al., Global Overview of Imitation Learning, Statistics, Machine Learning, arXiv preprint arXiv:1801.06503, 2018, 12 Pages. https://arxiv.org/pdf/1801.06503.pdf.
Pan et al., Agile Autonomous Driving Using End-to-End Deep Imitation Learning, arXiv preprint arXiv:1709.07174, 2017, 13 Pages. https://arxiv.org/pdf/1709.07174.pdf.

* cited by examiner

LEARNING-BASED BACKUP CONTROLLER FOR A WIND TURBINE

STATEMENT REGARDING FEDERALLY SPONSORED RESEARCH OR DEVELOPMENT

This invention was made with Government support under Contract No. DE-OE0000902 awarded by the U.S. Department of Energy (DOE). The Government has certain rights in the invention.

FIELD

The present disclosure relates generally to wind turbines and, more particularly, to a learning-based controller for a wind turbine that can be used as a backup controller in the event a supervisory controller is unavailable, e.g., due to a cyberattack.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

A plurality of wind turbines are commonly used in conjunction with one another to generate electricity and are commonly referred to as a "wind farm." Each of the individual wind turbines may be controlled via a turbine controller. Similarly, the overall wind farm may be controlled via a farm-level controller. Such controllers may also be connected to a network, either locally or via the Internet, such that the wind farm and the individual turbine controllers can be controlled online and in real-time. As the wind power business continues to increase in popularity, however, so too does the risk of cyberattack on the control systems thereof.

Moreover, wind turbines are dynamic systems operated under unknown and stochastic operation conditions (i.e., turbulent wind field). Thus, wind turbines are usually controlled using model-based controllers. These controllers require an accurate dynamic model of the wind farm and can only be obtained when the physical properties of the considered system (i.e., the wind turbine) are known in detail, which requires extensive domain knowledge. In the scenario where an existing model-based controller of a wind turbine cannot be trusted, e.g., due to a cyberattack, a back-up controller needs to be employed. However, since the dynamic models developed by other manufacturers cannot usually be accessed, a model-based backup controller for these assets can be hard to develop.

Accordingly, the present disclosure is directed to a learning-based wind turbine controller that can be used as a backup controller in the event a primary controller is unavailable, e.g., due to a cyberattack, that address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for providing backup control for a supervisory controller of at least one wind turbine. The method includes observing, via a learning-based backup controller of the at least one wind turbine, at least one operating parameter of the supervisory controller under normal operation. The method also includes learning, via the learning-based backup controller, one or more control actions of the at least one wind turbine based on the operating parameter(s). Further, the method includes receiving, via the learning-based backup controller, an indication that the supervisory controller is unavailable to continue the normal operation. Upon receipt of the indication, the method includes controlling, via the learning-based backup controller, the wind turbine(s) using the learned one or more control actions until the supervisory controller becomes available again. Moreover, the control action(s) defines a delta that one or more setpoints of the wind turbine(s) should be adjusted by to achieve a desired outcome. It should be understood that the method may further include any one or more of the additional features and/or steps described herein.

In another aspect, the present disclosure is directed to a system for providing backup control for a supervisory controller of at least one wind turbine. The system includes a supervisory controller and a learning-based backup controller communicatively coupled to the supervisory controller. The learning-based backup controller includes at least one processor configured to perform a plurality of operations, including but not limited to observing at least one operating parameter of the supervisory controller under normal operation, learning one or more control actions of the at least one wind turbine based on the at least one operating parameter, and controlling the at least one wind turbine using the learned one or more control actions when the supervisory controller is unavailable. Further, the control action(s) defines a delta that one or more setpoints of the at least one wind turbine should be adjusted by to achieve a desired outcome. It should be understood that the system may further include any one or more of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
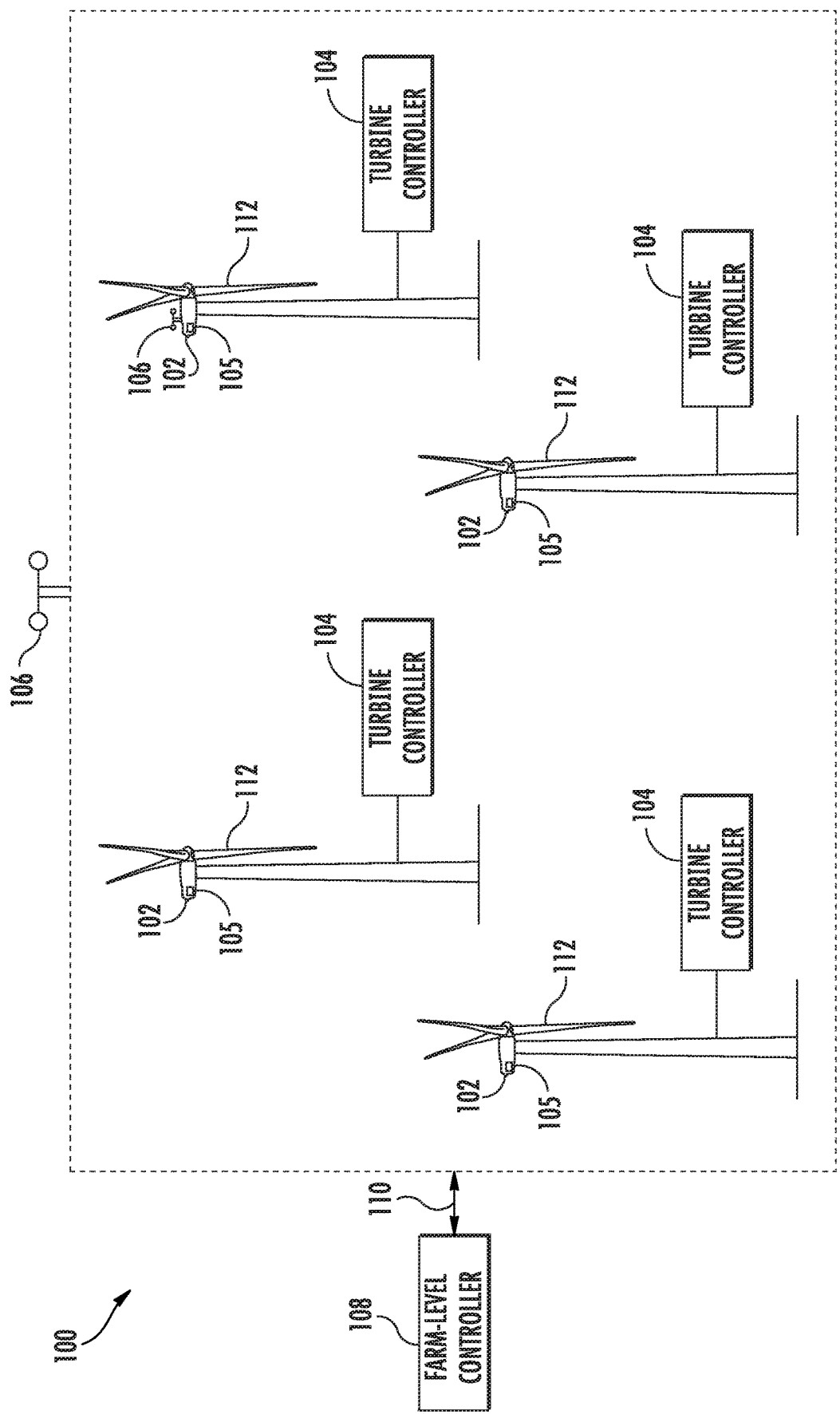
FIG. 1 illustrates a perspective view of one embodiment of a wind farm according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a learning-based wind turbine controller that can be used as a backup controller in the event a supervisory controller is unavailable. Thus, the present disclosure provides a method to implement an advanced learning-based backup controller configured to learn the control action of the supervisory controller by observing the easily available inputs and outputs of the supervisory controller under normal operation. The supervisory controller is typically a model-based controller. Thus, in the event of a cyberattack, or other scenarios which might require the use of backup controller, the advanced learning-based controller can take over and maintain the asset operational until the supervisory controller becomes usable again. Moreover, instead of directly predicting the setpoint as a function of input signals, the learning-based controller is configured to predict the delta/difference that the current setpoint should be adjusted by to achieve a desired outcome. This gives the learning-based controller a certain degree of robustness towards model/parameter mismatch that the controller encountered during training.

Referring now to the drawings, FIG. 1 illustrates an embodiment of a wind farm 100 containing a plurality of wind turbines 102 according to aspects of the present disclosure. The wind turbines 102 may be arranged in any suitable fashion. By way of example, the wind turbines 102 may be arranged in an array of rows and columns, in a single row, or in a random arrangement. Further, FIG. 1 illustrates an example layout of one embodiment of the wind farm 100. Typically, wind turbine arrangement in a wind farm is determined based on numerous optimization algorithms such that AEP is maximized for corresponding site wind climate. It should be understood that any wind turbine arrangement may be implemented, such as on uneven land, without departing from the scope of the present disclosure.

Figure 2:
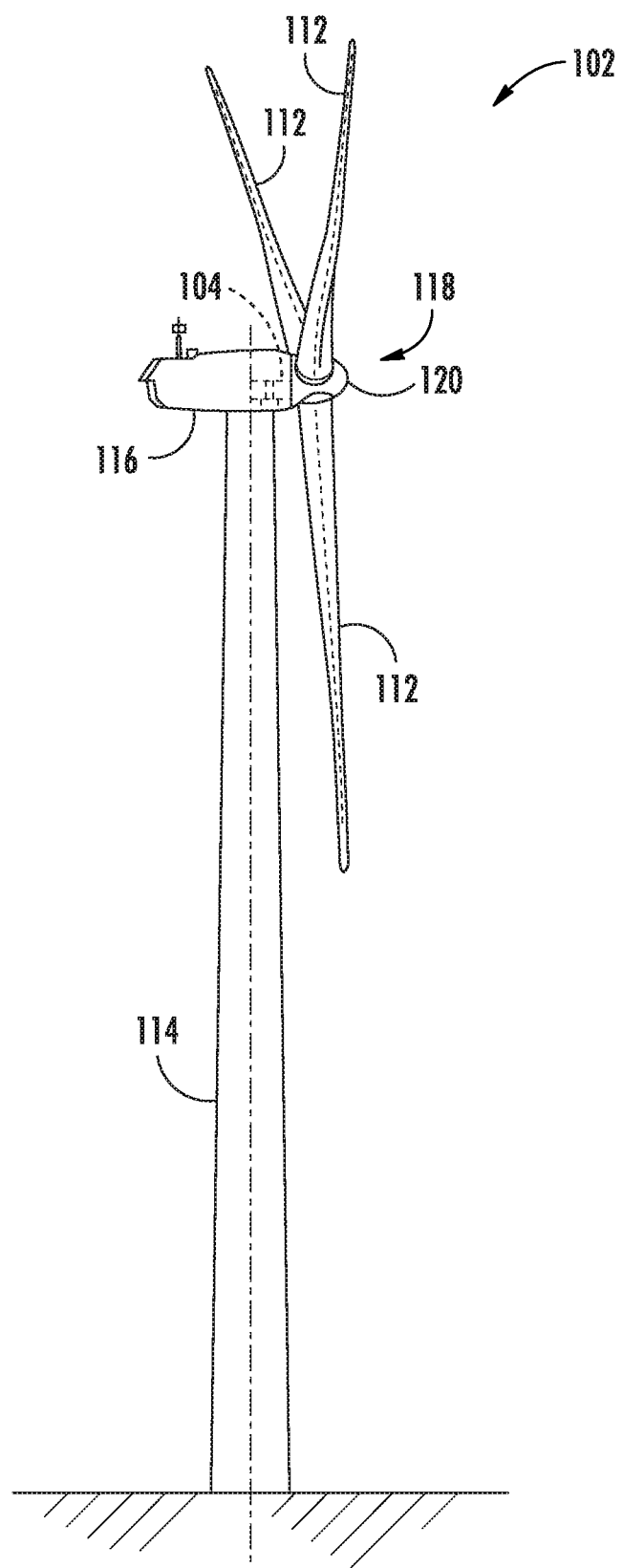
FIG. 2 illustrates a perspective view of one embodiment of a wind turbine according to the present disclosure.

In addition, it should be understood that the wind turbines 102 of the wind farm 100 may have any suitable configuration, such as for example, as shown in FIG. 2. As shown, the wind turbine 102 includes a tower 114 extending from a support surface, a nacelle 116 mounted atop the tower 114, and a rotor 118 coupled to the nacelle 16. The rotor includes a rotatable hub 120 having a plurality of rotor blades 112 mounted thereon, which is, in turn, connected to a main rotor shaft that is coupled to the generator housed within the nacelle 116 (not shown). Thus, the generator produces electrical power from the rotational energy generated by the rotor 118. It should be appreciated that the wind turbine 102 of FIG. 2 is provided for illustrative purposes only. Thus, one of ordinary skill in the art should understand that the invention is not limited to any particular type of wind turbine configuration.

As shown generally in the figures, each wind turbine 102 of the wind farm 100 may also include a turbine controller 104 communicatively coupled to a farm-level controller 108. Moreover, in one embodiment, the farm-level controller 108 may be coupled to the turbine controllers 104 through a network 110 to facilitate communication between the various wind farm components. The wind turbines 102 may also include one or more sensors 105, 106, 107 configured to monitor various operating, wind, and/or loading conditions of the wind turbine 102. For instance, the one or more sensors may include blade sensors for monitoring the rotor blades 112; generator sensors for monitoring generator loads, torque, speed, acceleration and/or the power output of the generator; wind sensors 106 for monitoring the one or more wind conditions; and/or shaft sensors for measuring loads of the rotor shaft and/or the rotational speed of the rotor shaft. Additionally, the wind turbine 102 may include one or more tower sensors for measuring the loads transmitted through the tower 114 and/or the acceleration of the tower 114. In various embodiments, the sensors may be any one of or combination of the following: accelerometers, pressure sensors, angle of attack sensors, vibration sensors, Miniature Inertial Measurement Units (MIMUs), camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors.

Figure 3:
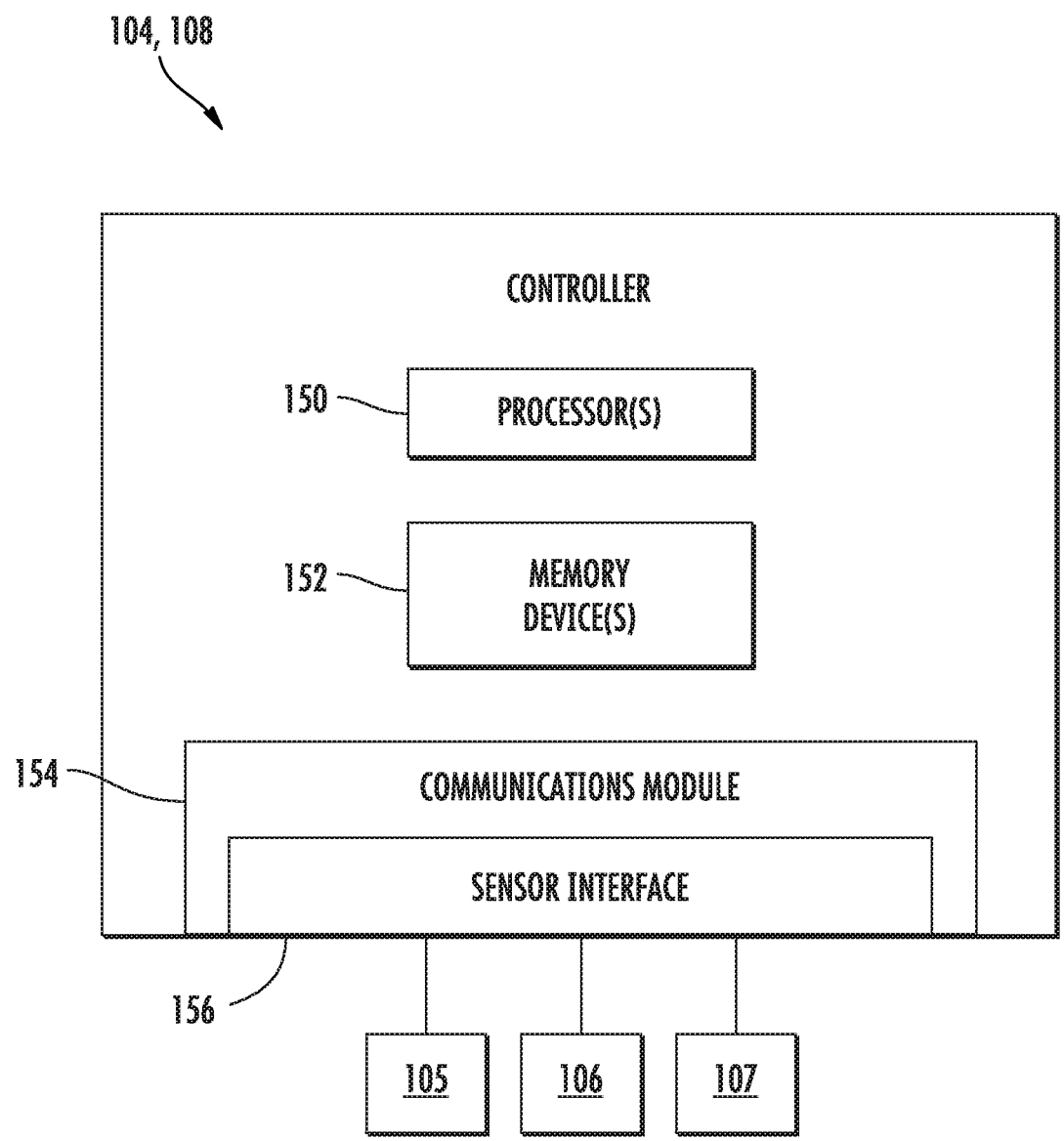
FIG. 3 illustrates a block diagram of one embodiment of a controller of a wind turbine and/or or wind farm according to the present disclosure.

Referring now to FIG. 3, a block diagram of an embodiment of suitable components that may be included within the farm-level controller 108, the turbine controller(s) 104, and/or other suitable controller according to the present disclosure is illustrated. As shown, the controller(s) 104, 108 may include one or more processor(s) 150 and associated memory device(s) 152 configured to perform a variety of computer-implemented functions (e.g., performing the methods, steps, calculations and the like and storing relevant data as disclosed herein). Additionally, the controller(s) 104, 108 may also include a communications module 154 to facilitate communications between the controller(s) 104, 108 and the various components of the wind turbine 102. Further, the communications module 154 may include a sensor interface 156 (e.g., one or more analog-to-digital converters) to permit signals transmitted from one or more sensors 105, 106, 107 (such as the sensors described herein) to be converted into signals that can be understood and processed by the processors 150. It should be appreciated that the sensors 105, 106, 107 may be communicatively coupled to the communications module 154 using any suitable means. For example, as shown, the sensors 105, 106, 107 are coupled to the sensor interface 156 via a wired connection. However, in other embodiments, the sensors 105, 106, 107 may be coupled to the sensor interface 156 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 152 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 152 may generally be configured to store suitable computer-readable instructions that, when implemented by the processor(s) 150, configure the controller(s) 104, 108 to perform various functions as described herein.

Moreover, the network 110 that couples the farm-level controller 108, the turbine controllers 104, and/or the wind sensors 106 in the wind farm 100 may include any known communication network such as a wired or wireless network, optical networks, and the like. In addition, the network 110 may be connected in any known topology, such as a ring, a bus, or hub, and may have any known contention resolution protocol without departing from the art. Thus, the network 110 is configured to provide data communication between the turbine controller(s) 104 and the farm-level controller 108 in near real time and/or online. Moreover, in an embodiment, the network 110 may include the Internet and/or cloud computing. Accordingly, the controller(s) 104, 108 may be susceptible to various cyberattacks.

Figure 4:
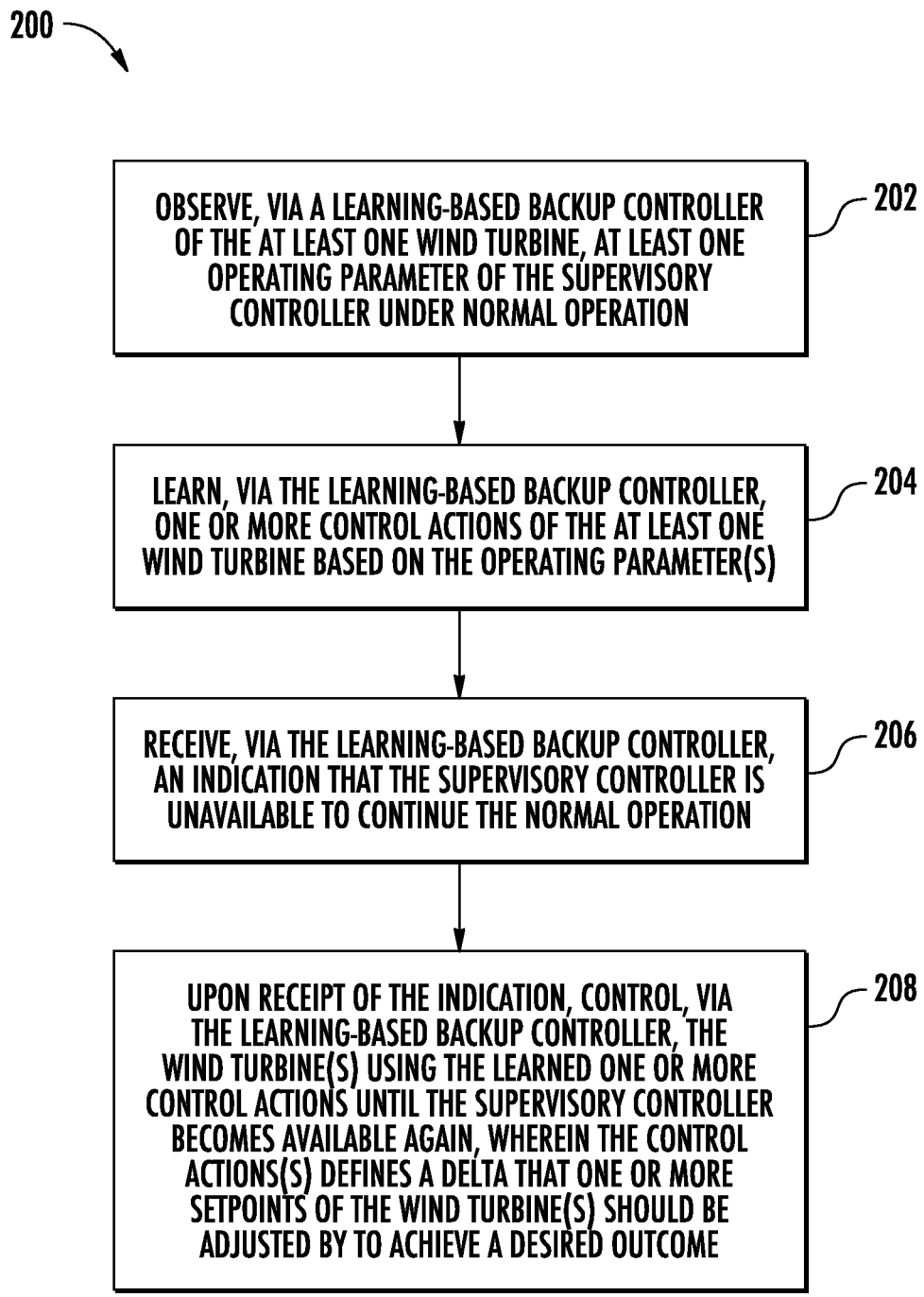
FIG. 4 illustrates a flow diagram of an embodiment of a method for providing backup control for a supervisory controller of at least one wind turbine according to the present disclosure according to the present disclosure.
Figure 5:
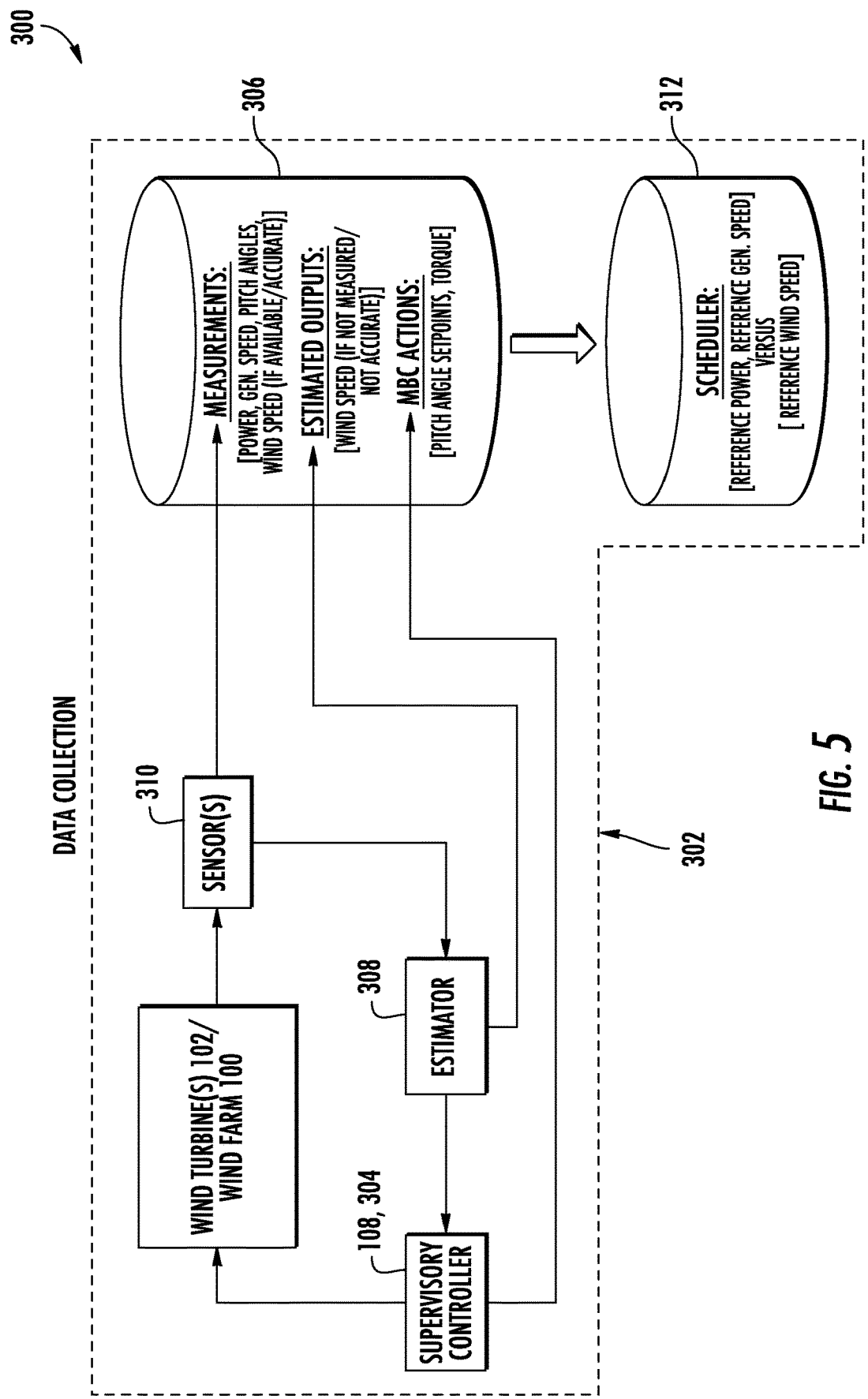
FIG. 5 illustrates a schematic diagram of an embodiment of a data collection phase of a learning-based backup controller according to the present disclosure.
Figure 6:
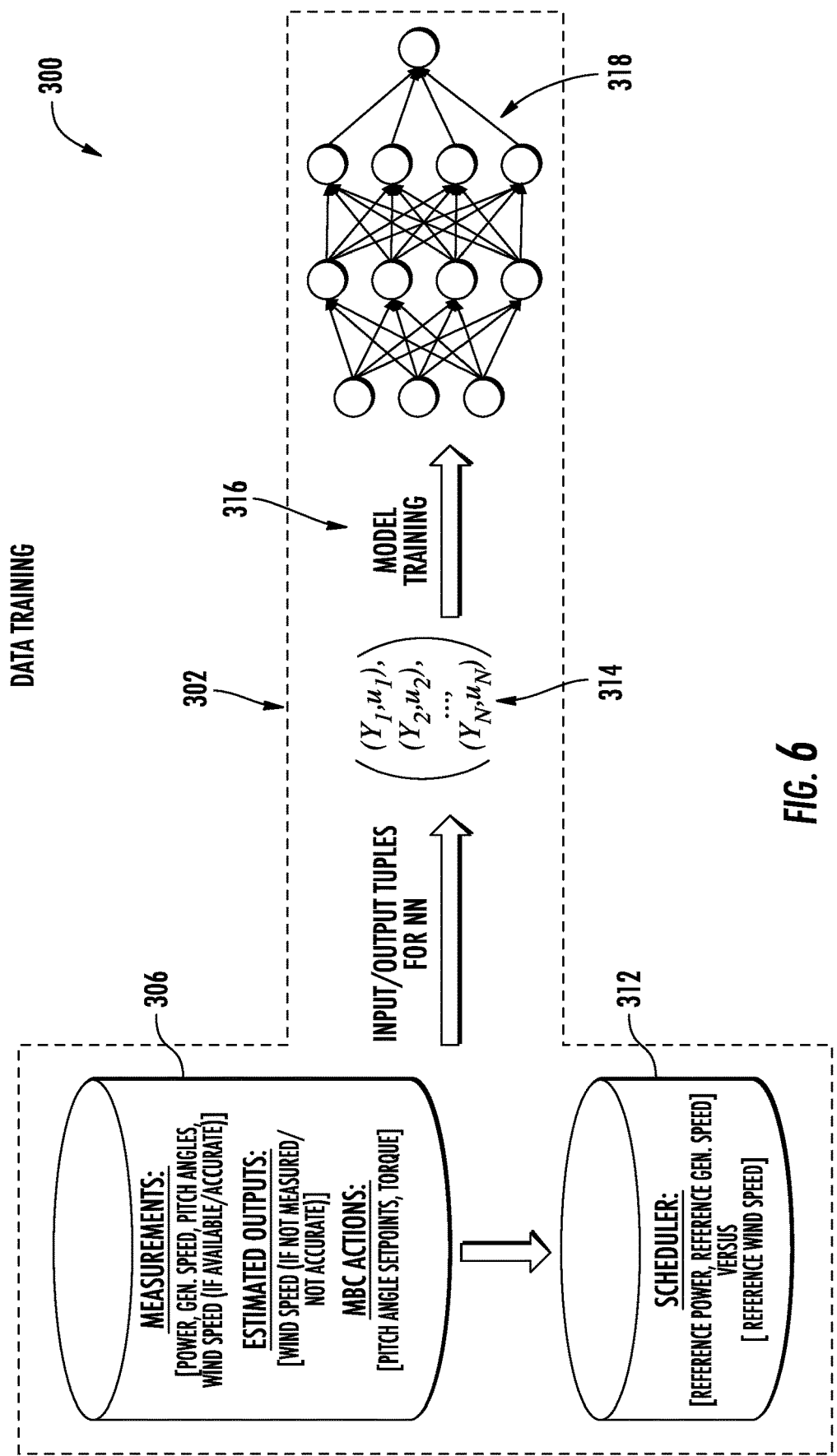
FIG. 6 illustrates a schematic diagram of an embodiment of a data collection phase of a learning-based backup controller according to the present disclosure.
Figure 7:
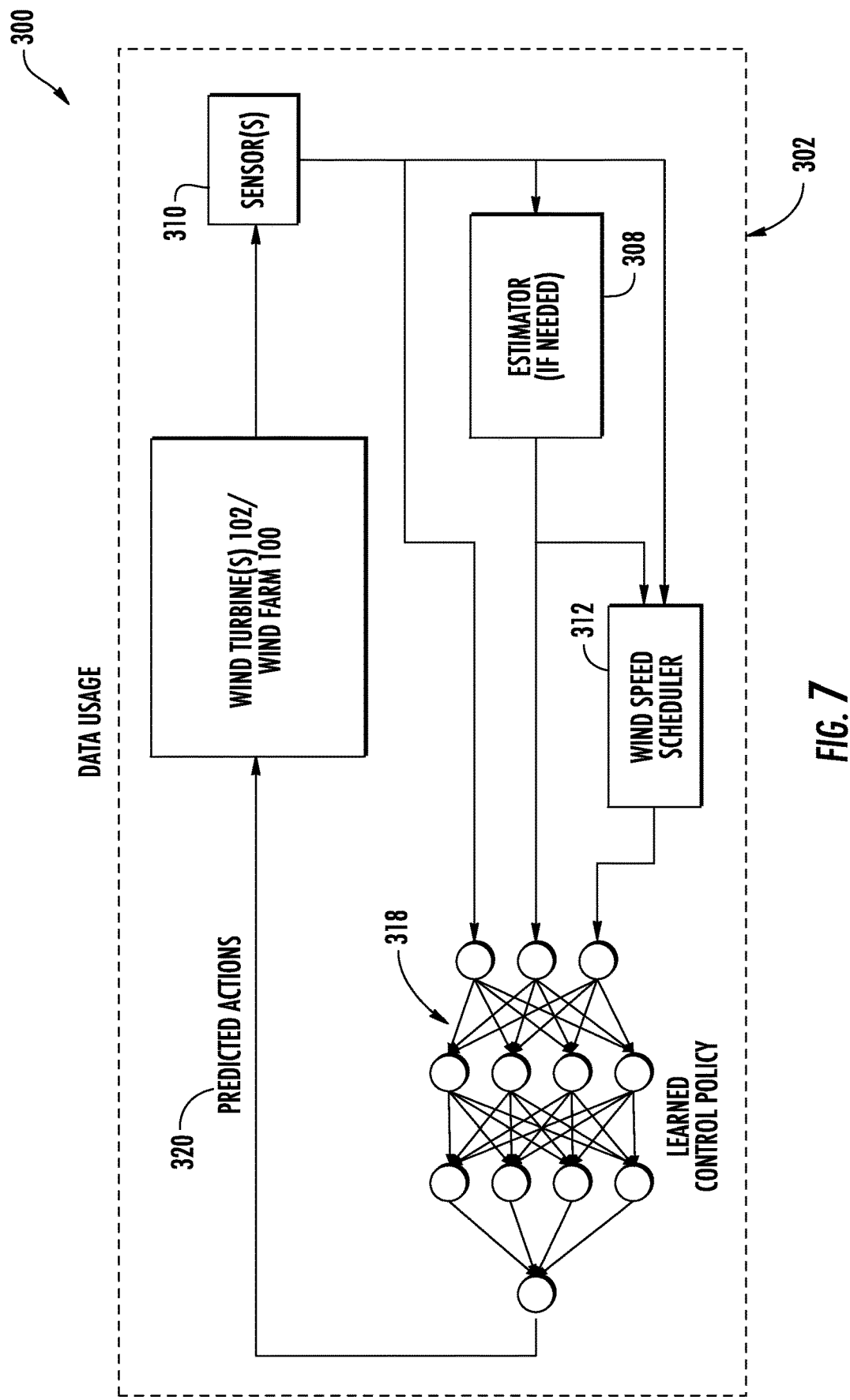
FIG. 7 illustrates a schematic diagram of an embodiment of a data collection phase of a learning-based backup controller according to the present disclosure.

Thus, referring now to FIGS. 4-7, a method 200 and system 300 for providing backup control for a supervisory controller of at least one wind turbine, such as one of the wind turbines 102 in the wind farm 100, are illustrated. More specifically, FIG. 4 illustrates a flow diagram of a method 200 for providing backup control for a supervisory controller of at least one wind turbine according to the present disclosure, whereas FIGS. 5-7 illustrate various schematic diagrams of different components of a system 300 (e.g., data collection, data training, and data usage) for providing backup control for a supervisory controller of at least one wind turbine according to the present disclosure. Further, it should be understood that the supervisory controller described herein may be the farm-level controller 108, one or more of the turbine controllers 104, and/or any other suitable controller located within the wind farm 100, one of the wind turbine(s) 102, or remote from the wind farm 100.

In general, as shown in FIG. 4, the method 200 is described herein for the wind turbine(s) 102 and/or the wind farm 100 described above. However, it should be appreciated that the disclosed method 200 may be used for any other wind turbine(s) and/or wind farm having any suitable configuration. Furthermore, as shown in FIG. 5, the system 300 includes, at least, a supervisory controller 304 (such as the farm-level controller 108) and a learning-based backup controller 302. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (202), the method 200 includes observing, via the learning-based backup controller 302 of the wind turbine(s) 102, at least one operating parameter of the supervisory controller 304 under normal operation. In particular, as shown in FIG. 5, a schematic diagram of the data collection phase of the learning-based backup controller 302 is illustrated. Thus, as shown, the learning-based backup controller 302 may observe the operating parameter(s) of the supervisory controller 304 under normal operation by observing a plurality of operating parameters of the supervisory controller 304 under normal operation, which may include inputs and/or outputs of the supervisory controller 304. More specifically, in such embodiments, as shown at 306, the plurality of operating parameters may include any one of or a combination of power output, pitch angle(s), generator speed, and/or wind speed. Moreover, as shown, the wind speed may be measured wind speed or estimated wind speed, depending on whether the measured wind speed is accurate or not. Thus, the plurality of operating parameters may include a combination of measured and/or estimated operating parameters. In such embodiments, the system 300 may also include an estimator module 308 for estimating the wind speed, i.e., if the measured wind speed is not measured and/or not accurate, as well as another other operating parameter. In addition, as shown, the system 300 may include one or more sensors 310 for measuring the various operating parameters described herein. Furthermore, the learning-based backup controller 302 may also observe a scheduler 312 of the system 300, which receives the various operating parameters and can determine a reference power, reference generator speed versus a reference wind speed, as an example.

Moreover, in an embodiment, as shown, the supervisory controller 304 may be a model-based controller (MBC). Such controllers require an accurate dynamic model of the wind farm 100 or wind turbine 102 and can only be obtained when the physical properties of the considered system (i.e., the wind turbine(s) 102) are known in detail. Thus, development of model-based controllers require extensive domain knowledge. In the scenario where an existing model-based methodology of an industrial wind turbine cannot be trusted, e.g., due to a cyberattack to the controller/estimator, a back-up controller needs to be employed. Since the dynamic models developed by other manufacturer cannot usually be accessed, a model-based backup controller for these assets can be hard to develop.

Referring back to FIG. 4, as shown at (204), the method 200 includes learning, via the learning-based backup controller 302, one or more control actions of the wind turbine(s) 102 based on the operating parameter(s). In particular, as shown in FIG. 6, a schematic diagram of the data training phase of the learning-based backup controller 302 is illustrated. For example, in an embodiment, as shown, the learning-based backup controller 302 may learn the control action(s) of the wind turbine(s) 102 based on the operating parameter(s) by generating a plurality of input/output tuple combinations 314 based on the plurality of operating parameters. As used herein, a tuple is a finite ordered list (sequence) of elements. Thus, as shown in FIG. 6, an n-tuple is a sequence (or ordered list) of n elements, where n is a non-negative integer. There is only one 0-tuple, referred to as the empty tuple. Accordingly, an n-tuple is defined inductively using the construction of an ordered pair. Furthermore, as shown, the learning-based backup controller 302 may include a machine learning algorithm 316 configured to learn the control action(s) of the wind turbine(s) 102 based on the input/output tuple combinations 314. Thus, as shown, the machine learning algorithm 316 is configured to generate a learned control policy 318 for the wind turbine(s) 102 and/or wind farm 100.

In several embodiments, for example, the machine learning algorithm 316 may include an artificial neural network (such a deep neural network, a recurrent neural network, or a convolutional neural network), an extreme learning machine, or similar, or combinations thereof. As used herein, an artificial neural network (also referred to simply as a neural network) generally refers to a neural network based on a collection of connected units or nodes called artificial neurons, which loosely model the neurons in a biological brain. Thus, each connection can transmit a signal to other neurons. An artificial neuron receives a signal, then processes the signal, and can signal neurons connected to it. The "signal" at a connection is a real number, and the output of each neuron is computed by some non-linear function of the sum of its inputs.

A deep neural network is an artificial neural network with multiple layers between the input and output layers. Furthermore, a deep neural network may be learned using either supervised or semi-supervised methods depending on the availability of data. Thus, there are different types of neural networks but they always include the same components: neurons, synapses, weights, biases, and functions. In particular, a recurrent neural network is a type of artificial neural network which uses sequential data or time series data. Further, recurrent neural networks utilize training data to learn and are distinguished by their "memory" as they take information from prior inputs to influence the current input and output. While traditional deep neural networks assume that inputs and outputs are independent of each other, the output of recurrent neural networks depend on the prior elements within the sequence.

A convolutional neural network generally refers to a class of deep neural networks, most commonly applied to analyzing visual imagery. Such networks employ a mathematical operation called convolution. Thus, convolutional neural networks are a specialized type of neural networks that use convolution in place of general matrix multiplication in at least one of their layers.

An extreme learning machine generally refers to a feedforward neural networks for classification, regression, clustering, sparse approximation, compression and feature learning with a single layer or multiple layers of hidden nodes, where the parameters of the hidden nodes (not just the weights connecting inputs to the hidden nodes) need not be tuned.

Referring back to FIG. 4, as shown at (206), the method 200 includes receiving, via the learning-based backup controller 302, an indication that the supervisory controller 304 is unavailable to continue the normal operation. For example, in an embodiment, the supervisory controller 304 may be unavailable due to a cyberattack, a hardware failure, a system fault, or for any other reason. Such notification may be manual or automatic.

Upon receipt of the indication, as shown at (208), the method 200 includes controlling, via the learning-based backup controller 302, the wind turbine(s) 102 (and/or the wind farm 100) using the learned control action(s)/learned control policy 318 until the supervisory controller 304 becomes available again. Moreover, in such embodiments, the learned control action(s)/learned control policy 318 defines at least one delta, such as a pitch angle delta and/or a torque delta, that one or more setpoints of the wind turbine(s) 102 (or the wind farm 100) should be adjusted by to achieve a desired outcome.

In particular, as shown in FIG. 7, a schematic diagram of the data usage phase of the learning-based backup controller 302 is illustrated. For example, in the illustrated embodiment, the learning-based backup controller 302 is configured to control the wind turbine(s) 102/wind farm 100 using the learned control action(s)/learned control policy 318 until the supervisory controller 304 becomes available again by sending predicted actions 320 from the learned control policy 318 to the wind turbine(s) 102/wind farm 100 during a time period in which the supervisory controller 304 is unavailable and optionally continuously training the learned control action(s)/learned control policy 318 based on additional operating parameters received during the time period.

For example, in an embodiment, the learning-based backup controller 302 may be configured to continuously train the learned control action(s)/learned control policy 318 using a human annotator. As used herein, annotation (e.g., annotated analytics) in machine learning generally refers to a process of labelling data in a manner that can be recognized by machines or computers. Furthermore, such annotation can be completed manually by humans as human annotators generally better interpret subjectivity, intent, and ambiguity within the data. Thus, machines can learn from the annotated data by recognizing the human annotations over time. In some cases, annotation can be learned by artificial intelligence and/or other algorithms, such as semi-supervised learning or clustering, as well as any other suitable accurate labeling process.

In other words, the learning-based backup controller 302 may include any suitable supervised machine learning algorithm that can apply what has been learned in the past to new data using labeled data to predict future decisions. Starting from the model build, the learning algorithm produces an inferred function to make predictions about the output values. As such, the learning-based backup controller 302 is able to provide targets for any new input after sufficient training. The learning algorithm can also compare its output with the correct, intended output and find errors in order to modify the model accordingly.

Various aspects and embodiments of the present invention are defined by the following numbered clauses:

Clause 1. A method for providing backup control for a supervisory controller of at least one wind turbine, the method comprising:
 observing, via a learning-based backup controller of the at least one wind turbine, at least one operating parameter of the supervisory controller under normal operation;
 learning, via the learning-based backup controller, one or more control actions of the at least one wind turbine based on the at least one operating parameter;
 receiving, via the learning-based backup controller, an indication that the supervisory controller is unavailable to continue the normal operation; and
 upon receipt of the indication, controlling, via the learning-based backup controller, the at least one wind turbine using the learned one or more control actions until the supervisory controller becomes available again, wherein the one or more control actions defines a delta that one or more setpoints of the at least one wind turbine should be adjusted by to achieve a desired outcome.

Clause 2. The method of clause 1, wherein observing the at least one operating parameter of the supervisory controller under normal operation further comprises:
 observing a plurality of operating parameters of the supervisory controller under normal operation Clause 3. The method of clause 2, wherein the plurality of operating parameters comprises at least one of power output, pitch angle, generator speed, measured wind speed, or estimated wind speed.

Clause 4. The method of clauses 2-3, wherein the plurality of operating parameters comprises a combination of measured and estimated operating parameters.

Clause 5. The method of clauses 2-4, wherein learning, via the learning-based backup controller, the one or more control actions of the wind turbine based on the at least one operating parameter further comprises:
  generating a plurality of input/output tuple combinations based on the plurality of operating parameters; and
  training, via a machine learning algorithm of the learning-based backup controller, the one or more control actions of the wind turbine based on the plurality of input/output tuple combinations.

Clause 6. The method of clause 5, wherein the machine learning algorithm comprises at least one of a deep neural network, a recurrent neural network, or a convolutional neural network, or an extreme learning machine.

Clause 7. The method of any of the preceding clauses, wherein controlling, via the learning-based backup controller, the at least one wind turbine using the learned one or more control actions until the supervisory controller becomes available again further comprises:
  sending, via the learning-based backup controller, the learned one or more control actions to the at least one wind turbine during a time period in which the supervisory controller is unavailable; and
  continuously training the learned one or more control actions based on additional operating parameters received during the time period.
  wherein the one or more control actions defines a delta that one or more setpoints of the wind turbine should be adjusted by to achieve a desired outcome.

Clause 8. The method of any of the preceding clauses, wherein the delta that one or more setpoints of the at least one wind turbine should be adjusted by to achieve the desired outcome comprises at least one of a pitch angle delta or a torque delta.

Clause 9. The method of any of the preceding clauses, wherein the supervisory controller is a model-based controller.

Clause 10. The method of any of the preceding clauses, wherein the supervisory controller is a turbine controller of the at least one wind turbine or a farm-level controller of a wind farm containing the at least one wind turbine.

Clause 11. The method of any of the preceding clauses, wherein the supervisory controller is unavailable due to at least one of a cyberattack, a hardware failure, or a system fault.

Clause 12. A system for providing backup control for a supervisory controller of at least one wind turbine, the system comprising:
  a supervisory controller;
  a learning-based backup controller communicatively coupled to the supervisory controller, the learning-based backup controller comprising at least one processor configured to perform a plurality of operations, the plurality of operations comprising:
    observing at least one operating parameter of the supervisory controller under normal operation;
    learning one or more control actions of the at least one wind turbine based on the at least one operating parameter; and
    controlling the at least one wind turbine using the learned one or more control actions when the supervisory controller is unavailable,
    wherein the one or more control actions defines a delta that one or more setpoints of the at least one wind turbine should be adjusted by to achieve a desired outcome.

Clause 13. The system of clause 12, wherein observing the at least one operating parameter of the supervisory controller under normal operation further comprises:
  observing a plurality of operating parameters of the supervisory controller under normal operation Clause 14. The system of clause 13, wherein the plurality of operating parameters comprises at least one of power output, pitch angle, generator speed, measured wind speed, or estimated wind speed.

Clause 15. The system of clauses 13-14, wherein the plurality of operating parameters comprises a combination of measured and estimated operating parameters.

Clause 16. The system of clauses 13-15, wherein learning, via the learning-based backup controller, the one or more control actions of the wind turbine based on the at least one operating parameter further comprises:
  generating a plurality of input/output tuple combinations based on the plurality of operating parameters; and
  training, via a machine learning algorithm of the learning-based backup controller, the one or more control actions of the wind turbine based on the plurality of input/output tuple combinations.

Clause 17. The system of clause 16, wherein the machine learning algorithm comprises at least one of a deep neural network, a recurrent neural network, or a convolutional neural network, or an extreme learning machine.

Clause 18. The system of clauses 12-17, wherein controlling, via the learning-based backup controller, the at least one wind turbine using the learned one or more control actions until the supervisory controller becomes available again further comprises:
  sending, via the learning-based backup controller, the learned one or more control actions to the at least one wind turbine during a time period in which the supervisory controller is unavailable; and
  continuously training the learned one or more control actions based on additional operating parameters received during the time period.
wherein the one or more control actions defines a delta that one or more setpoints of the wind turbine should be adjusted by to achieve a desired outcome.

Clause 19. The system of clauses 12-18, wherein the delta that one or more setpoints of the at least one wind turbine should be adjusted by to achieve the desired outcome comprises at least one of a pitch angle delta or a torque delta.

Clause 20. The system of clauses 12-19, wherein the supervisory controller is a model-based controller, wherein the model-based controller is a turbine controller of the at least one wind turbine or a farm-level controller of a wind farm containing the at least one wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing backup control for a supervisory controller of at least one wind turbine, the method comprising:
   observing, via a machine learning algorithm of a learning-based backup controller of the at least one wind turbine, at least one operating parameter of the supervisory controller under normal operation;
   learning, via the machine learning algorithm, one or more control actions of the at least one wind turbine based on the at least one operating parameter;
   calculating, via the machine learning algorithm, one or more deltas that one or more setpoints of the at least one wind turbine should be adjusted by to achieve a desired outcome based on the one or more control actions instead of directly predicting the one or more setpoints as a function of input signals;
   receiving, via the learning-based backup controller, an indication that the supervisory controller is unavailable to continue the normal operation; and
   upon receipt of the indication, controlling, via the learning-based backup controller, the at least one wind turbine using the learned one or more control actions and the one or more deltas until the supervisory controller becomes available again.

2. The method of claim 1, wherein observing the at least one operating parameter of the supervisory controller under normal operation further comprises: observing a plurality of operating parameters of the supervisory controller under normal operation.

3. The method of claim 2, wherein the plurality of operating parameters comprises at least one of power output, pitch angle, generator speed, measured wind speed, or estimated wind speed.

4. The method of claim 2, wherein the plurality of operating parameters comprises a combination of measured and estimated operating parameters.

5. The method of claim 2, wherein learning, via the learning-based backup controller, the one or more control actions of the wind turbine based on the at least one operating parameter further comprises:
   generating a plurality of input/output tuple combinations based on the plurality of operating parameters; and
   training, via the machine learning algorithm of the learning-based backup controller, the one or more control actions of the wind turbine based on the plurality of input/output tuple combinations.

6. The method of claim 5, wherein the machine learning algorithm comprises at least one of a deep neural network, a recurrent neural network, a convolutional neural network, or an extreme learning machine.

7. The method of claim 1, wherein controlling, via the learning-based backup controller, the at least one wind turbine using the learned one or more control actions until the supervisory controller becomes available again further comprises:
   sending, via the learning-based backup controller, the learned one or more control actions to the at least one wind turbine during a time period in which the supervisory controller is unavailable; and
   continuously training the learned one or more control actions based on additional operating parameters received during the time period.

8. The method of claim 1, wherein the one or more deltas that one or more setpoints of the at least one wind turbine should be adjusted by to achieve the desired outcome comprises at least one of a pitch angle delta or a torque delta.

9. The method of claim 1, wherein the supervisory controller is a model-based controller.

10. The method of claim 1, wherein the supervisory controller is a turbine controller of the at least one wind turbine or a farm-level controller of a wind farm containing the at least one wind turbine.

11. The method of claim 1, wherein the supervisory controller is unavailable due to at least one of a cyberattack, a hardware failure, or a system fault.

12. A system for providing backup control for a supervisory controller of at least one wind turbine, the system comprising:
   a supervisory controller;
   a learning-based backup controller communicatively coupled to the supervisory controller, the learning-based backup controller comprising at least one processor configured to perform a plurality of operations, the plurality of operations comprising:
   observing at least one operating parameter of the supervisory controller under normal operation;
   learning one or more control actions of the at least one wind turbine based on the at least one operating parameter; and
   calculating, via the machine learning algorithm, one or more deltas that one or more setpoints of the at least one wind turbine should be adjusted by to achieve a desired outcome based on the one or more control actions instead of directly predicting the one or more setpoints as a function of input signals;
   controlling the at least one wind turbine using the learned one or more control actions when the supervisory controller is unavailable.

13. The system of claim 12, wherein observing the at least one operating parameter of the supervisory controller under normal operation further comprises: observing a plurality of operating parameters of the supervisory controller under normal operation.

14. The system of claim 13, wherein the plurality of operating parameters comprises at least one of power output, pitch angle, generator speed, measured wind speed, or estimated wind speed.

15. The system of claim 13, wherein the plurality of operating parameters comprises a combination of measured and estimated operating parameters.

16. The system of claim 13, wherein learning, via the learning-based backup controller, the one or more control actions of the wind turbine based on the at least one operating parameter further comprises:
   generating a plurality of input/output tuple combinations based on the plurality of operating parameters; and
   training, via a machine learning algorithm of the learning-based backup controller, the one or more control actions of the wind turbine based on the plurality of input/output tuple combinations.

17. The system of claim 16, wherein the machine learning algorithm comprises at least one of a deep neural network, a recurrent neural network, a convolutional neural network, or an extreme learning machine.

18. The system of claim 12, wherein controlling, via the learning-based backup controller, the at least one wind turbine using the learned one or more control actions until the supervisory controller becomes available again further comprises:
   sending, via the learning-based backup controller, the learned one or more control actions to the at least one wind turbine during a time period in which the supervisory controller is unavailable; and continuously training the learned one or more control actions based on additional operating parameters received during the time period;

wherein the one or more control actions defines a delta that one or more setpoints of the wind turbine should be adjusted by to achieve a desired outcome.

19. The system of claim 12, wherein the delta that one or more setpoints of the at least one wind turbine should be adjusted by to achieve the desired outcome comprises at least one of a pitch angle delta or a torque delta.

20. The system of claim 12, wherein the supervisory controller is a model-based controller, wherein the model-based controller is a turbine controller of the at least one wind turbine or a farm-level controller of a wind farm containing the at least one wind turbine.

* * * * *